(12) United States Patent
Kurimoto

(10) Patent No.: US 11,974,549 B2
(45) Date of Patent: May 7, 2024

(54) WIRELESS TERMINAL, LIVESTOCK MONITORING SYSTEM, AND LIVESTOCK MONITORING METHOD

(71) Applicant: PACIFIC INDUSTRIAL CO., LTD., Ogaki (JP)

(72) Inventor: Masaru Kurimoto, Ogaki (JP)

(73) Assignee: PACIFIC INDUSTRIAL CO., LTD., Ogaki (JP)

( * ) Notice: Subject to any disclaimer, the term of this patent is extended or adjusted under 35 U.S.C. 154(b) by 89 days.

(21) Appl. No.: 17/910,571

(22) PCT Filed: Mar. 18, 2021

(86) PCT No.: PCT/JP2021/011026
§ 371 (c)(1),
(2) Date: Sep. 9, 2022

(87) PCT Pub. No.: WO2022/054317
PCT Pub. Date: Mar. 17, 2022

(65) Prior Publication Data
US 2023/0137167 A1     May 4, 2023

(30) Foreign Application Priority Data

Sep. 10, 2020 (JP) .................................. 2020-151790

(51) Int. Cl.
*G08B 13/14* (2006.01)
*A01K 11/00* (2006.01)
*A01K 29/00* (2006.01)

(52) U.S. Cl.
CPC .......... *A01K 29/005* (2013.01); *A01K 11/006* (2013.01)

(58) Field of Classification Search
CPC .... A01K 29/005; A01K 11/006; A01K 11/00; A01K 29/00; Y02A 40/70; A61D 19/00
(Continued)

(56) References Cited

U.S. PATENT DOCUMENTS 5,697,384 A    12/1997   Miyawaki et al.
5,984,875 A *   11/1999   Brune .................. A61B 5/6861
                                                                              600/549

(Continued)

FOREIGN PATENT DOCUMENTS

CN        101472469 A     7/2009
JP        S46-004526 B1    2/1971
(Continued)

OTHER PUBLICATIONS

Mar. 24, 2023 Office Action issued in Chinese Patent Application No. 202180018303.4.
(Continued)

*Primary Examiner* — Tai T Nguyen
(74) *Attorney, Agent, or Firm* — Oliff PLC

(57) ABSTRACT

A wireless terminal includes a pressure sensor, a wireless circuit, and a case accommodating the pressure sensor and the wireless circuit in a waterproof manner, and is left inside a stomach of a livestock animal to measure pressure inside the stomach and wirelessly transmit acquired pressure data. The case includes a cylindrical case body and a lid member closing an opening of the case body. The lid member has a measurement hole extending between inside and outside of the lid member and a protection wall part located outside of the case body. The measurement hole has a pressure-receiving pressure measurement part inside for measurement of the pressure and is closed. The measurement hole includes a first linear part and a second linear part intersecting in T shape with the first linear part, and has distal ends open to an outer face of the protection wall part.

20 Claims, 7 Drawing Sheets

(58) Field of Classification Search
USPC .................................................. 340/573.1
See application file for complete search history.

(56) References Cited

U.S. PATENT DOCUMENTS

| | | | |
|---|---|---|---|
| 11,307,728 B1* | 4/2022 | Rettedal | G06F 3/0481 |
| 2008/0236500 A1* | 10/2008 | Hodges | A01K 11/007 |
| | | | 340/573.3 |
| 2009/0182207 A1* | 7/2009 | Riskey | A61B 5/1124 |
| | | | 600/587 |
| 2010/0030036 A1 | 2/2010 | Mottram et al. | |
| 2012/0088988 A1 | 4/2012 | Sato et al. | |
| 2014/0107434 A1 | 4/2014 | Mottram et al. | |
| 2018/0310885 A1 | 11/2018 | Kim | |
| 2021/0338165 A1 | 11/2021 | Kim | |

FOREIGN PATENT DOCUMENTS

| | | |
|---|---|---|
| JP | H06-276877 A | 10/1994 |
| JP | 2016-144428 A | 8/2016 |
| JP | 2018-074992 A | 5/2018 |
| JP | 2019-098173 A | 6/2019 |
| WO | 2010/147175 A1 | 12/2010 |

OTHER PUBLICATIONS

May 25, 2021 Search Report issued in International Patent Application No. PCT/JP2021/011026.

Nov. 20, 2020 Office Action issued in Japanese Patent Application No. 2020-151790.

\* cited by examiner

WIRELESS TERMINAL, LIVESTOCK MONITORING SYSTEM, AND LIVESTOCK MONITORING METHOD

TECHNICAL FIELD

The present disclosure relates to a wireless terminal for monitoring physical conditions of livestock, a livestock monitoring system, and a livestock monitoring method.

BACKGROUND ART

A wireless terminal for this type of application, which is left inside a stomach of a livestock animal for wireless transmission of body temperature and pH measurement data, has been conventionally known (see, for example, Patent Document 1).

RELATED ART DOCUMENT

Patent Document

Patent Document 1: JP 2018-74992 A (paragraphs [0035] to [0039], and FIG. 2)

SUMMARY OF THE INVENTION

Technical Problem to be Solved by the Invention

Livestock that feed mainly on roughage such as cows are prone to bloat because of constant gas production due to the rumen fermentation of roughage for digestion and absorption. While conventional wireless terminals provide measurement data useful for finding cows with bloat, it was often too late, and therefore there is a need for the development of a technique that enables detection of early stages or prior signs of bloat.

Means of Solving the Problem

A first aspect of the present disclosure made to solve the above problem is a wireless terminal including a pressure sensor, a wireless circuit, and a case that accommodates the pressure sensor and the wireless circuit in a waterproof manner, the wireless terminal being left inside a stomach of a livestock animal to measure pressure inside the stomach and wirelessly transmit acquired pressure data, in which the case includes a cylindrical case body with a bottom at one end and an opening at an other end, and a lid member closing the opening of the case body, the lid member has a measurement hole extending between inside and outside of the lid member and a protection wall part located outside of the case body, the measurement hole having a pressure-receiving pressure measurement part inside for measurement of the pressure and being closed with the pressure-receiving pressure measurement part, the measurement hole includes a first linear part extending linearly from an inner face of the lid member to an internal portion of the protection wall part, and a second linear part extending through the protection wall part in a direction perpendicular to an axial direction of the case body, intersecting in T shape with the first linear part, and having distal ends open to an outer face of the protection wall part.

A second aspect of the present disclosure is a wireless terminal including a pressure sensor, a wireless circuit, and a case that accommodates the pressure sensor and the wireless circuit in a waterproof manner, the wireless terminal being left inside a stomach of a livestock animal to measure pressure inside the stomach and wirelessly transmit acquired pressure data, in which the case includes a cylindrical case body with a bottom at one end and an opening at an other end, and a lid member fitted to the case body so as to close the opening of the case body and having a measurement hole extending between inside and outside of the lid member, the pressure sensor is fixed to the case body, protruding toward the lid member, and having a pressure-receiving pressure measurement part at a distal end for measurement of the pressure, and the pressure sensor fits into the measurement hole so that the pressure-receiving pressure measurement part closes the measurement hole by fitting the lid member to the case body.

A third aspect of the present disclosure is a wireless terminal having a pressure sensor and a wireless circuit, and left inside a stomach of a livestock animal to measure pressure inside the stomach and wirelessly transmit acquired pressure data, the wireless terminal including: a sensor-carrying circuit board having the pressure sensor mounted thereon, and a waterproofed sensor-carrying waterproof part; a waterproof case having therein a waterproof compartment that accommodates an electrical circuit disposed in a part other than the sensor-carrying waterproof part of the wireless terminal, and supporting the sensor-carrying circuit board such that the sensor-carrying waterproof part extends out of the waterproof compartment; and a sensor protection case integrally formed in or attached to the waterproof case, accommodating the sensor-carrying waterproof part, and having a plurality of through holes extending between inside and outside of the sensor protection case, in which the wireless terminal has a center of gravity located at a lower point of the wireless terminal in a basic posture so as to be maintained in substantially the basic posture in liquid, and a surface of the sensor-carrying waterproof part on which the pressure sensor is mounted faces downward, and a pressure-receiving pressure measurement part of the pressure sensor faces downward when the wireless terminal takes the basic posture.

MODE FOR CARRYING OUT THE INVENTION

First Embodiment

Figure 1:
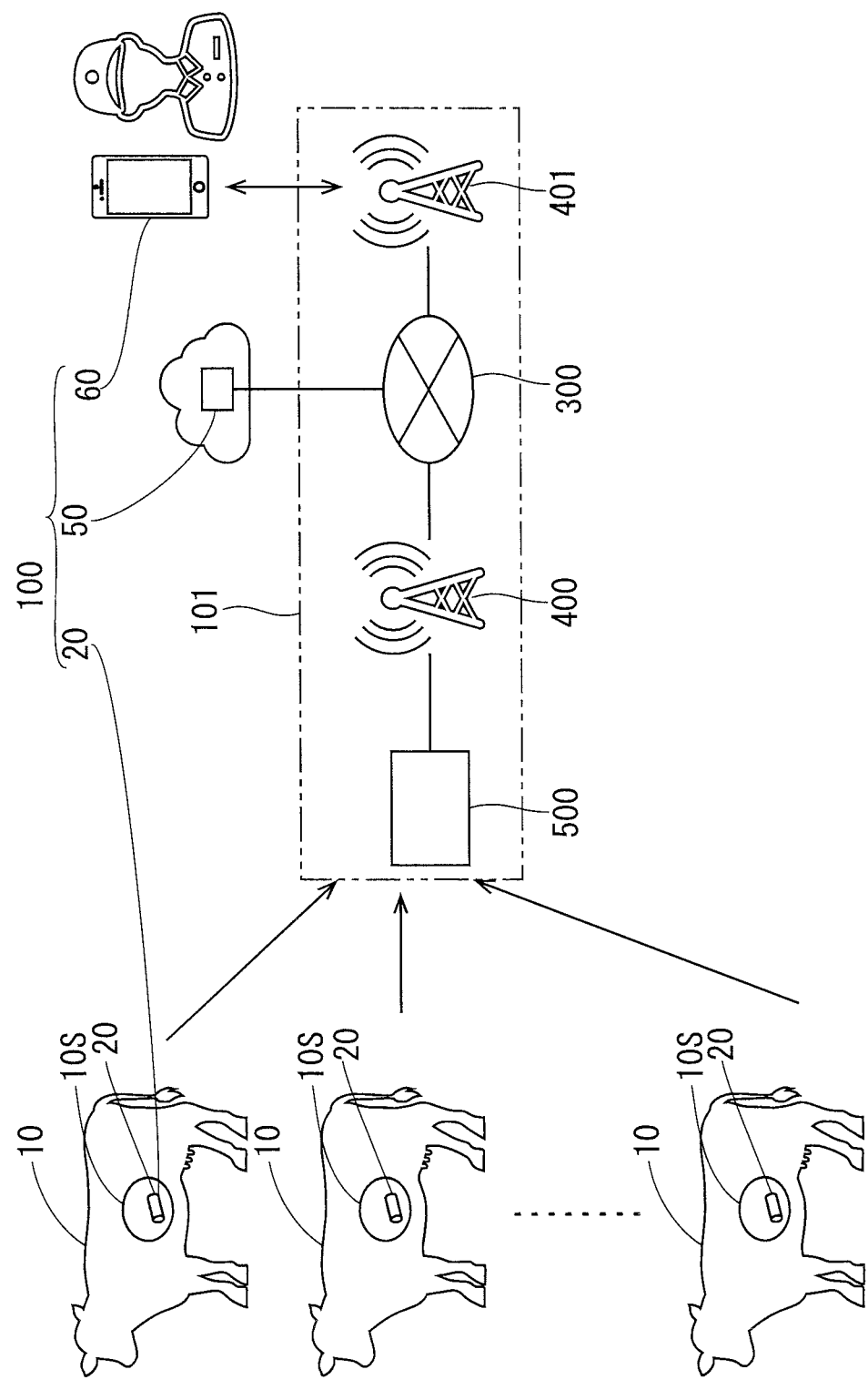
FIG. 1 is a schematic diagram illustrating an overall configuration of a livestock monitoring system according to a first embodiment of the present invention.

Hereinafter, a first embodiment of the livestock monitoring system 100 of the present disclosure will be described with reference to FIG. 1 to FIG. 5. The livestock monitoring system 100 of this embodiment illustrated in FIG. 1 includes a plurality of wireless terminals 20 left in stomachs 10S (specifically, first and second chambers of the stomach) of a plurality of cows 10 that is monitoring targets, a cloud server 50 that manages the information acquired by the wireless terminals 20, and a user terminal 60 that receives the information acquired by the wireless terminals 20 via the cloud server 50. The wireless terminals 20, cloud server 50, and user terminal 60 are connected to each other via a communication network 101 including wireless base stations 400 and 401. The cloud server 50 corresponds to a "monitoring apparatus" in the claims.

Figure 2:
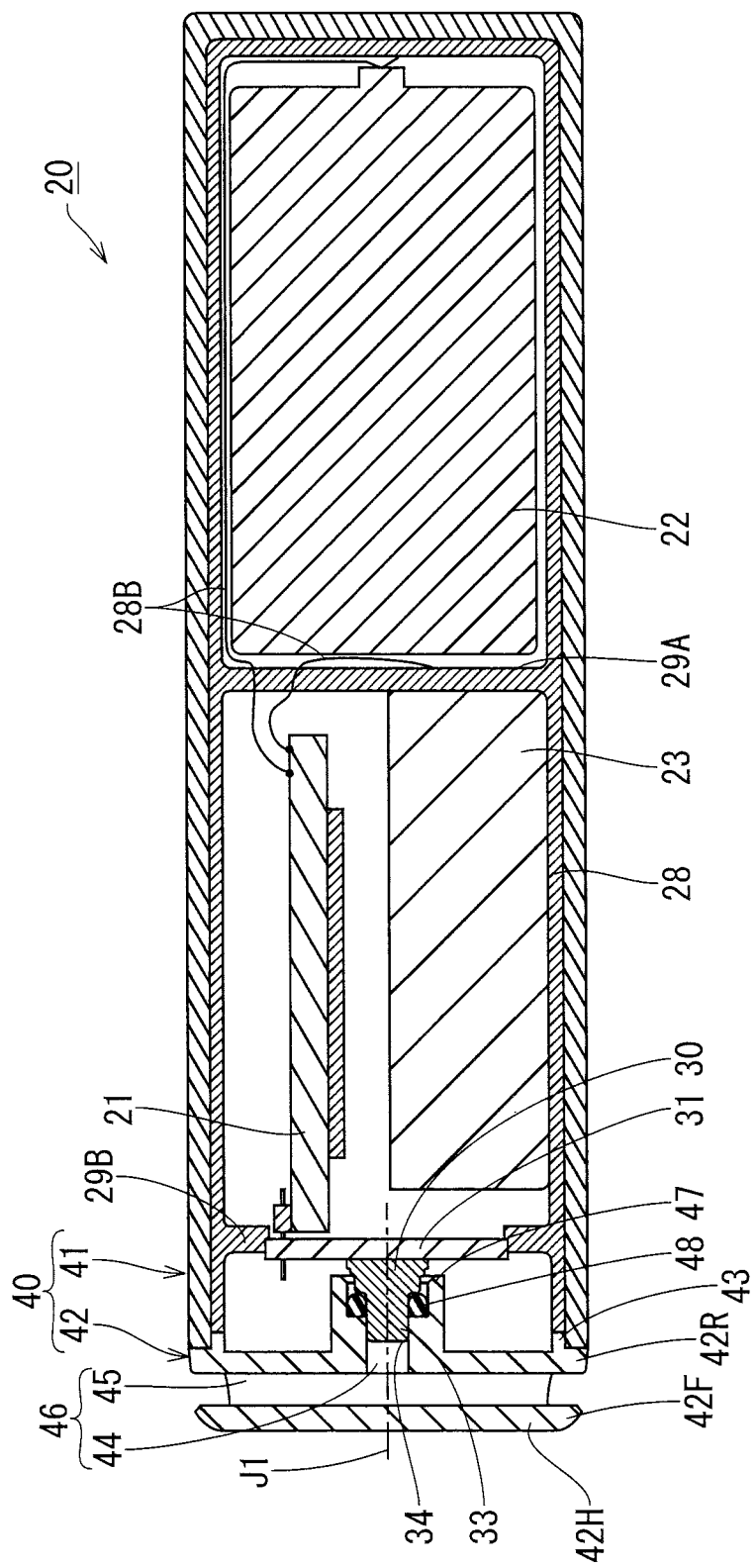
FIG. 2 is a cross-sectional side view of a wireless terminal.

As shown in FIG. 2, the wireless terminal 20 is equipped with a main circuit board 21, a sub circuit board 31, a battery 22, etc., contained inside a case 40. The case 40 is made up of a cylindrical case body 41 with one end open and the other end closed, and a lid member 42 that closes the opening on the one end. In the description below, the axial direction of the case 40 will be referred to as "front-back direction," and the end closed by the lid member 42 as "front side."

The case body 41 and lid member 42 in this embodiment are molded products of resin, for example. Both or either of them may be a metal product.

The battery 22, main circuit board 21, and sub circuit board 31 are supported by a support frame 28 that is snugly fit inside the case body 41 and fixed inside the case body 41, for example.

The support frame 28 has a circular relay disc 29A located substantially at the center in the front-back direction of the case body 41 and perpendicular to the center axis J1 of the case body 41. The battery 22 is supported by a rear part of the support frame 28 behind the relay disc 29A and accommodated deep in the case body 41. A pair of bus bars 28B is provided to the support frame 28 to be connected to electrodes on a front face and a rear face of the battery 22. The terminal ends of the pair of bus bars 28B are disposed on a front face of the relay disc 29A.

The main circuit board 21 and sub circuit board 31 are supported by a front part of the support frame 28 relative to the relay disc 29A. The main circuit board 21 is disposed parallel to the center axis J1 and shifted from the center axis J1 of the case body 41, for example. Therefore, when the wireless terminal 20 takes a basic posture to be described later, the main circuit board 21 is positioned above the center axis J1 and substantially parallel to the center axis. A rear end portion of the main circuit board 21 is opposed to the relay disc 29A, and the pair of bus bars 28B mentioned above is connected to the rear end portion of the main circuit board 21.

Figure 4:
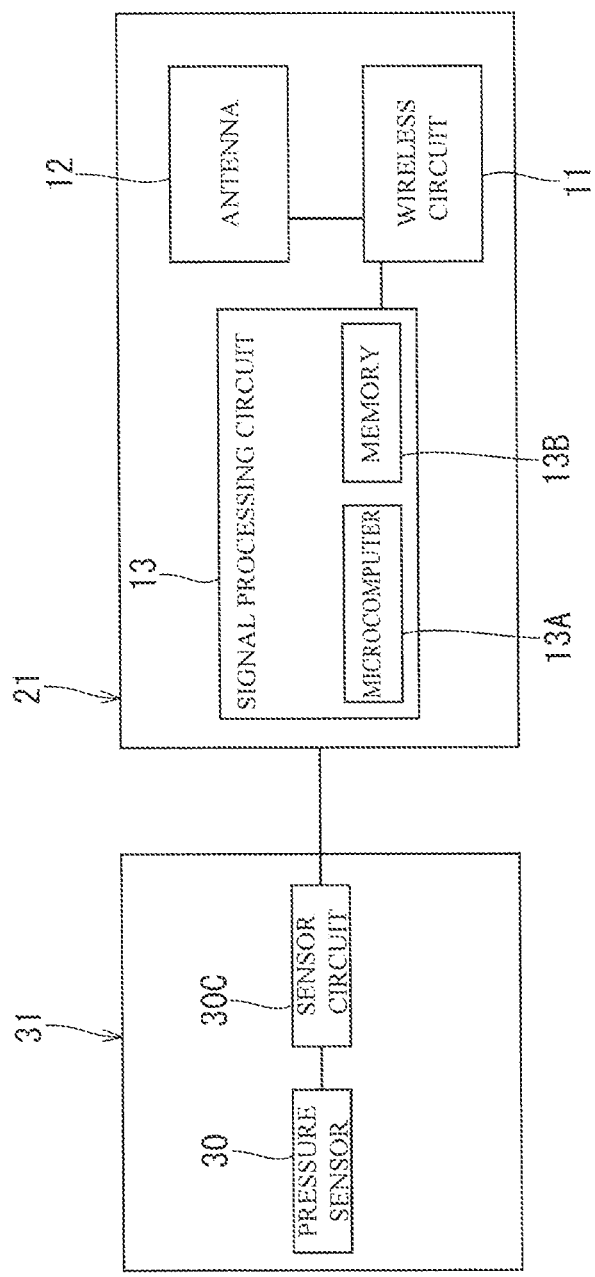
FIG. 4 is a conceptual diagram of a main circuit board and a sub circuit board.

As illustrated in FIG. 4, a wireless circuit 11, a signal processing circuit 13, and so on are mounted on the main circuit board 21, and an antenna 12 (such as loop antenna) of the wireless circuit 11 is printed on the board. The signal processing circuit 13 includes a microcomputer 13A and a memory 13B. The memory 13B stores a signal processing program executed by the microcomputer 13A, terminal identification data for distinguishing the wireless terminals 20 from one another, and so on.

A weight 23 is supported on the support frame 28 below the main circuit board 21. The weight 23 is provided for maintaining the wireless terminal 20 in the basic posture to be described later, and has a semicircular cross-sectional shape that is substantially the same as the half of the circular internal cross-sectional shape of the case body 41. The weight 23 is made of a material having a higher specific gravity than the battery 22 (e.g., iron or tungsten).

The sub circuit board 31 is supported by an annular plate-shaped relay disc 29B that is provided to the support frame 28 and perpendicular to the center axis J1 of the case body 41. A plurality of pins protruding from the main circuit board 21 passes through a plurality of through holes in the sub circuit board 31 and are soldered so that an electrical circuit on the sub circuit board 31 is connected to an electrical circuit on the main circuit board 21. As illustrated in FIG. 4, a pressure sensor 30, a sensor circuit 30C that operates the pressure sensor 30 for measurement of pressure and so on are mounted on the sub circuit board 31. The signal processing circuit 13 of the main circuit board 21 takes in pressure measurement results obtained by the pressure sensor 30 via the sensor circuit 30C.

Figure 3:
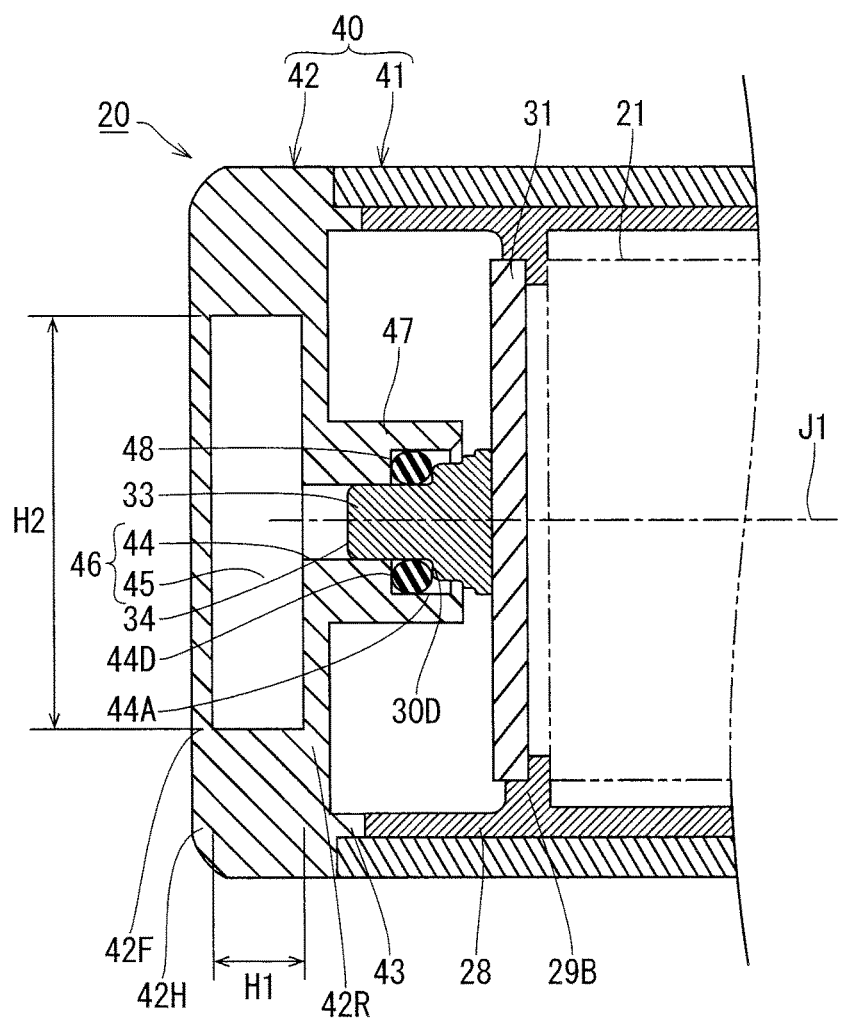
FIG. 3 is a cross-sectional plan view of a front end part of the wireless terminal.

The pressure sensor 30 is disposed on a front face of the sub circuit board 31 as illustrated in FIG. 3. The pressure sensor is columnar and extends forward from the sub circuit board 31. The sub circuit board 31 is positioned on the support frame 28 such that the center axis of the pressure sensor 30 is coaxial with the center axis J1 of the case body 41. The pressure sensor 30 has a stepped surface 30D in a midway position in the axial direction so that the pressure sensor is reduced stepwise in diameter. A front end face of a head part 33 on a front side of the stepped surface 30D of the pressure sensor 30 serves as a pressure-receiving measurement surface 34 that receives pressure, which the pressure sensor 30 measures. One end of the support frame 28 is abutted against an inner end face of the case body 41 and thereby positioned in the axial direction of the case body 41, which also sets the pressure sensor 30 in position in the axial direction of the case body 41.

The support frame 28 may be fixed to the case body 41 with adhesive or by welding, or may be fixed by being held between the inner end face of the case body 41 and an inner face of the lid member 42 to be described next. In this embodiment, the pressure-receiving measurement surface 34 of the pressure sensor 30 corresponds to a "pressure-receiving pressure measurement part" in the claims.

The lid member 42 is disc-shaped and has the same outside diameter as that of the case body 41. Provided on a rear face of the lid member are an annular rib 43 protruding from near the outer edge, and a rear-side center protrusion 47 protruding from a center part, as shown in FIG. 2. By fitting the annular rib 43 into the case body 41 to bring the rear-side outer edge of the lid member 42 into contact with the front face of the case body 41, the center of the lid member 42 is aligned with that of the case body 41, as well as the lid member 42 is axially positioned. The lid member is fixed along the entire outer edge in a waterproof manner by vibration welding or with adhesive.

The lid member 42 has a lid body 42H, which corresponds to a "protection wall part" in the claims, and is positioned on a front side of the front face of the case body 41. This lid body 42H is formed with a second linear part 45 radially extending through the lid body 42H. As shown in FIG. 3, the second linear part 45 has a laterally wide flat cross-sectional shape. The second linear part 45 gives the lid body 42H a structure having a front plate part 42F and a rear plate part 42R facing each other in the front-back direction interposing the second linear part 45 therebetween. More specifically, the second linear part 45 has a larger width H1 in the axial direction of the case body 41 than the thickness in the front-back direction of wall portions of the lid body 42H left in the front and back of the second linear part 45. The second linear part 45 has a width H2 in a direction perpendicular to the axial direction of the case body 41 that is approximately half of the outside diameter of the case body 41.

A first linear part 44 is formed in a center part of the rear-side center protrusion 47. The first linear part 44 has a circular cross section. Positioned coaxial with the center axis J1 of the lid member 42, the first linear part extends from a rear face of the rear-side center protrusion 47 to the second linear part 45 and intersects in T shape with the second linear part 45. These first linear part 44 and second linear part 45 form a measurement hole 46. The first linear part 44 is formed with an O-ring receiving part 44A at the rear end that is increased stepwise in diameter, where an O-ring 48 is accommodated. With the lid member 42 fitted to the case body 41, the head part 33 of the pressure sensor 30 extends through an inside of the O-ring 48, so that the tip of the head part 33 fits into the first linear part 44 on a front side of the O-ring receiving part 44A, and the O-ring 48 is compressed between an inner circumferential surface of the O-ring receiving part 44A and an outer circumferential surface of the head part 33 of the pressure sensor 30. Namely, the first linear part 44 of the measurement hole is closed in a waterproof manner by the pressure sensor 30.

The wireless terminal 20 has a specific gravity of 1.8 g/cm$^3$ or more, which is determined from the entire weight of the wireless terminal 20 and the entire volume of the wireless terminal 20. Therefore, the wireless terminal 20 is submerged in the liquid inside the stomach 10S of the cow 10 and stably stays inside the stomach 10S. The wireless terminal 20 has the center of gravity G roughly at the center in the axial direction of the wireless terminal 20 (which is also the axial direction of the case 40), for example. The battery 22 and weight 23 that are heaviest are arranged on both sides of this center of gravity G. The center of gravity G of the wireless terminal 20 in a direction perpendicular to the axial direction is located on the opposite side from the main circuit board 21 across the center axis J1 of the wireless terminal 20 (which is also the center axis of the case 40). Therefore, the wireless terminal 20 is maintained in its basic posture or a posture close to the basic posture in which the wireless terminal is horizontal, with its axis oriented horizontal inside the stomach 10S of the cow 10, the main circuit board 21 being positioned above the weight 23. The antenna 12 of the wireless circuit 11 is directed so as to have an upward transmission direction when the wireless terminal 20 is maintained in the basic posture.

Figure 5:
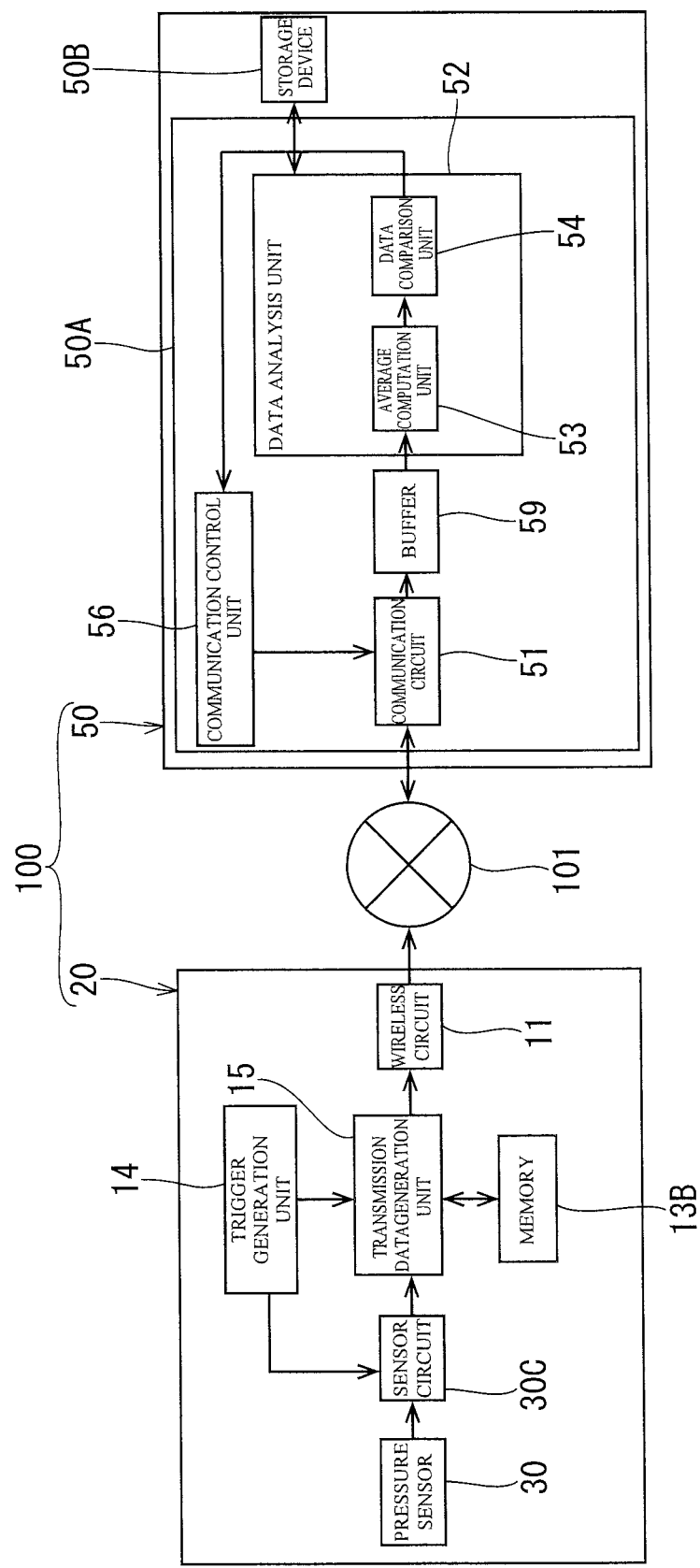
FIG. 5 is a block diagram of the wireless terminal and a monitoring apparatus.

The wireless terminal 20 is configured as has been described above. FIG. 5 shows a control configuration of the wireless terminal 20 in block diagram. A trigger generation unit 14 and a transmission data generation unit 15 and so on shown in FIG. 5, which were not mentioned in the above description of the structure of the wireless terminal 20, are configured by the microcomputer 13A executing a signal processing program in the memory 13B. The wireless terminal 20 operates as follows. The trigger generation unit 14 in the wireless terminal 20 generates a transmission trigger at a certain interval (of, e.g., 10 minutes), and every time a transmission trigger is generated, the pressure sensor 30 performs pressure measurement. The transmission data generation unit 15 generates transmission data including pressure data, which is a measurement result obtained by the pressure sensor 30, and the terminal identification data stored in the memory 13B. This is then transmitted wirelessly by the wireless circuit 11. Thus, in the livestock monitoring system 100 of this embodiment that uses the plurality of wireless terminals 20 left inside the stomachs 10S of the plurality of cows 10, the plurality of wireless terminals 20 wirelessly transmits transmission data including the most recent data of pressure inside the stomachs 10S of the plurality of cows 10.

The transmission data from the plurality of wireless terminals 20 is received by the cloud server 50 that constitutes livestock monitoring system 100 of this embodiment.

Specifically, as illustrated in FIG. 1, the transmission data from the wireless terminals 20 is first received by a gateway 500 installed in a cowhouse or farm where the plurality of cows 10 is being raised. The gateway 500 is operable as a relay base station. The gateway 500 transmits the transmission data from the wireless terminals 20 to the cloud server 50 via a general-purpose communication line 300. While one gateway 500 is connected to one cloud server 50 in this embodiment, a plurality of gateways 500 may be connected to one cloud server 50, with each of cowhouses or farms, for example, being equipped with a gateway 500.

The cloud server 50 includes at least one or more personal computers including a monitoring terminal 50A and a storage device 50B. The monitoring terminal 50A is realized by executing a signal processing program (not shown), with the control blocks illustrated in FIG. 5, and operates as follows. The cloud server 50 takes in transmission data sent from the plurality of wireless terminals 20 via a communication circuit 51, assigns the time of reception to the data, for example, and stores the data in a buffer 59. A data analysis unit 52 compares pressure data contained in the communication data stored in the buffer 59, and identifies the wireless terminal 20 that has sent abnormal pressure data. Terminal identification data of each wireless terminal 20 is stored in the storage device 50B beforehand, so that it is possible to identify each wireless terminal 20 from the terminal identification data.

Specifically, an average computation unit 53 of the data analysis unit 52 computes an overall average value, which is for example an average value of the pressure data from all the wireless terminals 20 within a most recent predetermined period (of, e.g., one hour), and computes individual average values of the wireless terminals 20. A data comparison unit 54 of the data analysis unit 52 then compares a difference obtained by subtracting the overall average value from the individual average value, for example, with a reference difference value stored in the storage device 50B, and determines that there is no abnormality when the difference is smaller than the reference difference value, or determines that there is an abnormality when the difference is larger than the reference difference value. The data comparison unit then generates abnormality determination data including the terminal identification data of the wireless terminal 20 that is the source of the pressure data, alert information in accordance with the level of the difference, and the time of determination. When the data comparison unit 54 generates abnormality determination data, the user terminal 60 is notified of this abnormality determination data by a communication control unit 56.

More particularly, the data comparison unit 54 determines if the difference is smaller than a first reference difference value that is the smallest one of first to third reference difference values stored in the storage device 50B, or larger than the first reference difference value but smaller than the second reference difference value that is the second smallest, or larger than the second reference difference value and smaller than the third reference value, or larger than the third reference difference value, and switches the alert information in accordance with the level of the difference. The alert information in a case where the difference is determined to be larger than the third reference difference value contains information indicating that the cow 10 having the wireless terminal 20 that transmitted the pressure data is bloated.

The storage device 50B may store, for each wireless terminal 20, livestock animal identification information (e.g., cowhouse number or photograph of the cow 10) of each cow 10 in which the wireless terminal 20 is left, and the communication control unit 56 may notify the user terminal 60 of the livestock animal identification information together with the abnormality determination data, to enable emergency treatment.

The user terminal 60 may be owned by a livestock owner, for example, and may be any of a personal computer, tablet, or smartphone, as a common communication means capable of communication with the cloud server 50. The user terminal 60 receives a notification of abnormality determination data from the cloud server 50 as described above. The user terminal 60 may be configured to be able to access the cloud server 50 and freely browse the cloud server 50 for the status of the stomach 10S of each cow 10 as to whether or not there is any abnormality in pressure, for example.

The structure of the livestock monitoring system 100 according to this embodiment is as has been described above. The livestock monitoring system 100 provides the following advantageous effects. Namely, the livestock monitoring system 100 in which wireless terminals 20 left inside the stomachs 10S of the plurality of cows 10 wirelessly transmit the pressure data inside the stomachs 10S enables detection of early stages or prior signs of bloat in cows 10 based on the pressure data.

Cows 10 feed mainly on high fiber roughages such as hay or pasture, and it matters how well the pressure-receiving measurement surface 34 of the pressure sensor 30 in the wireless terminal 20 is protected from these feedstuffs. The pressure sensor 30 of the wireless terminal 20 of this embodiment has the pressure-receiving measurement surface 34 positioned inside the measurement hole 46 formed in the case 40 that accommodates the main circuit board 21 and sub circuit board 31, so that contact between roughages and the pressure-receiving measurement surface 34 is suppressed, which contributes to improved durability. Moreover, the sensor is less susceptible to the dynamic pressure of the liquid inside the stomach 10S when measuring the liquid pressure, which contributes to improved measurement accuracy.

The center of gravity of the wireless terminal 20 is located at a lower point of the wireless terminal 20 in its basic posture so that the wireless terminal 20 is maintained in substantially the same basic posture in the liquid. This helps keep a consistent orientation of the antenna 12 of the wireless circuit 11 and enables consistent measurement and stable wireless transmission. Since the antenna 12 is oriented so as to have an upward transmission direction in this basic posture, the radio waves propagate through a relatively thin part of the body of the cow 10, so that radio wave attenuation is reduced.

The livestock monitoring system 100 of this embodiment uses the cloud server 50 to collect and analyze the pressure data measured by the wireless terminals 20, so that the plurality of cows 10 raised in a plurality of cowhouses or farms can be collectively and remotely monitored.

Since the cloud server 50 acquires terminal identification data as well as pressure data from the plurality of wireless terminals 20, it is possible to monitor the pressure inside the stomachs 10S of the plurality of cows 10 distinguishing from one another. The data analysis unit 52 of the cloud server 50 identifies wireless terminals 20 that have sent abnormal pressure data and determines health conditions of the respective cows 10, which reduces the burden on livestock managers.

Second Embodiment

This embodiment is not illustrated, and it differs from the first embodiment only in the configuration of the data analysis unit 52 in the cloud server 50 shown in FIG. 5. Namely, the cloud server 50 of the livestock monitoring system 100 of this embodiment does not include the average computation unit 53. The storage device 50B stores reference data to be compared with pressure data from each wireless terminal 20. In the first embodiment, the data comparison unit 54 of the data analysis unit 52 compares an overall average value of the pressure data with individual average values. This embodiment is configured such that the data comparison unit 54 of the cloud server 50 determines a difference between reference data and individual pressure data. Other features are the same as those of the first embodiment. The configuration of this embodiment provides similar advantageous effects as those of the first embodiment.

Third Embodiment

Figure 6:
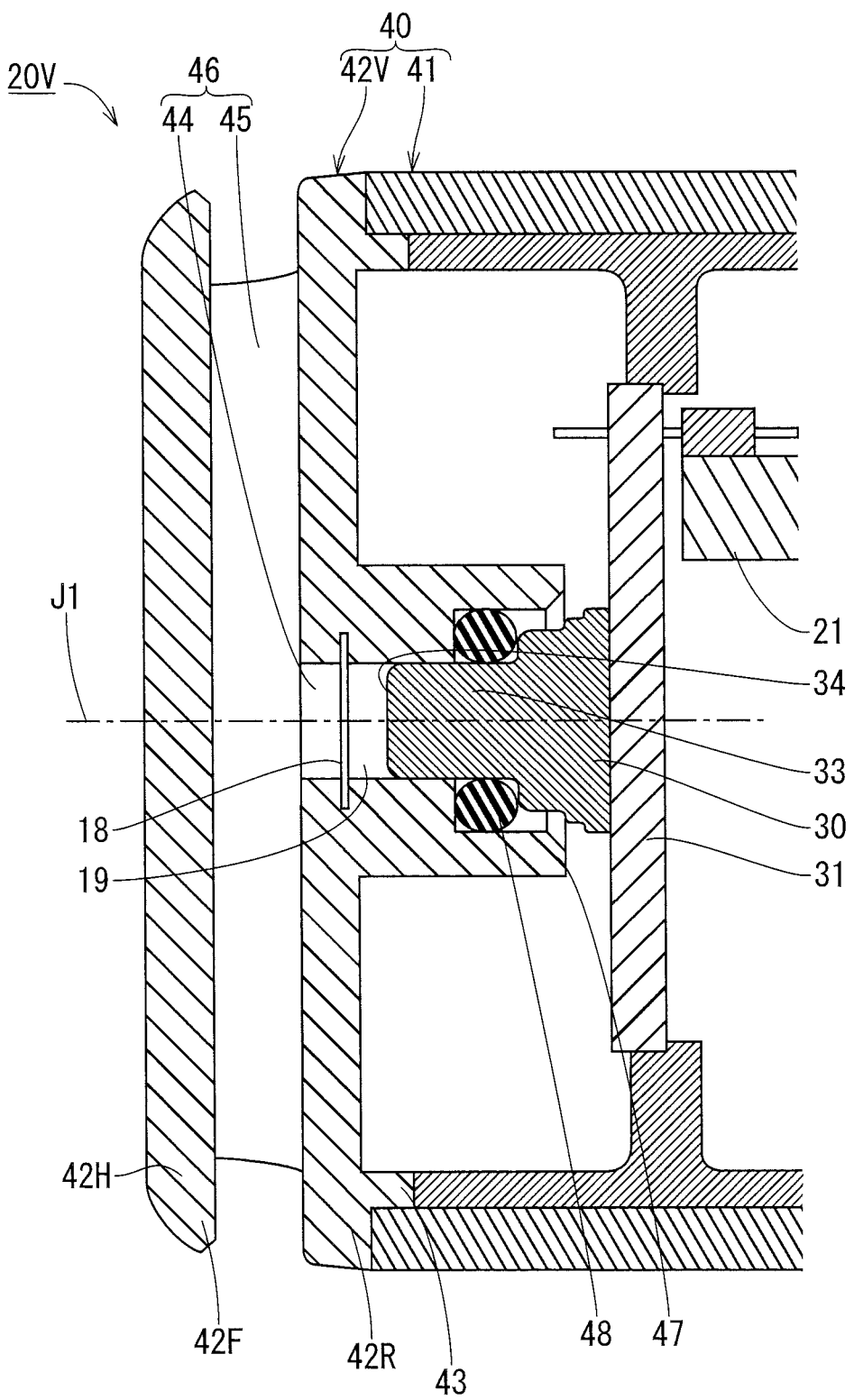
FIG. 6 is a cross-sectional side view of a front end part of the wireless terminal according to a third embodiment.

This embodiment is illustrated in FIG. 6 and different from the first embodiment only in the structure of a lid member 42V of a wireless terminal 20V. Namely, in the lid member 42V, a waterproof sheet 18 is stretched in a midway position of the first linear part 44 in the measurement hole 46, so that a sealed space 19 is formed between the waterproof sheet 18 and the pressure-receiving measurement surface 34 of the pressure sensor 30. The waterproof sheet 18 undergoes elastic deformation in accordance with the pressure inside the stomach 10S, i.e., the internal pressure of the sealed space 19 changes in accordance with the pressure of the liquid inside the stomach 10S, so that this internal pressure of the sealed space 19 is measured by the pressure sensor 30 as the pressure inside the stomach 10S. The configuration of this embodiment provides similar advantageous effects as those of the first embodiment, and moreover, the pressure sensor 30 is protected more securely thereby improving its durability.

In the first embodiment, the pressure-receiving measurement surface 34 of the pressure sensor 30 corresponds to a "pressure-receiving pressure measurement part" of the present disclosure. In this embodiment, the waterproof sheet 18 corresponds to the "pressure-receiving pressure measurement part" of the present disclosure. Instead of providing the sealed space 19, the waterproof sheet 18 may be overlapped on the pressure-receiving measurement surface 34, so that the pressure received on the pressure-receiving measurement surface 34 through the waterproof sheet 18 is measured as the pressure inside the stomach 10S.

Fourth Embodiment

Figure 7:
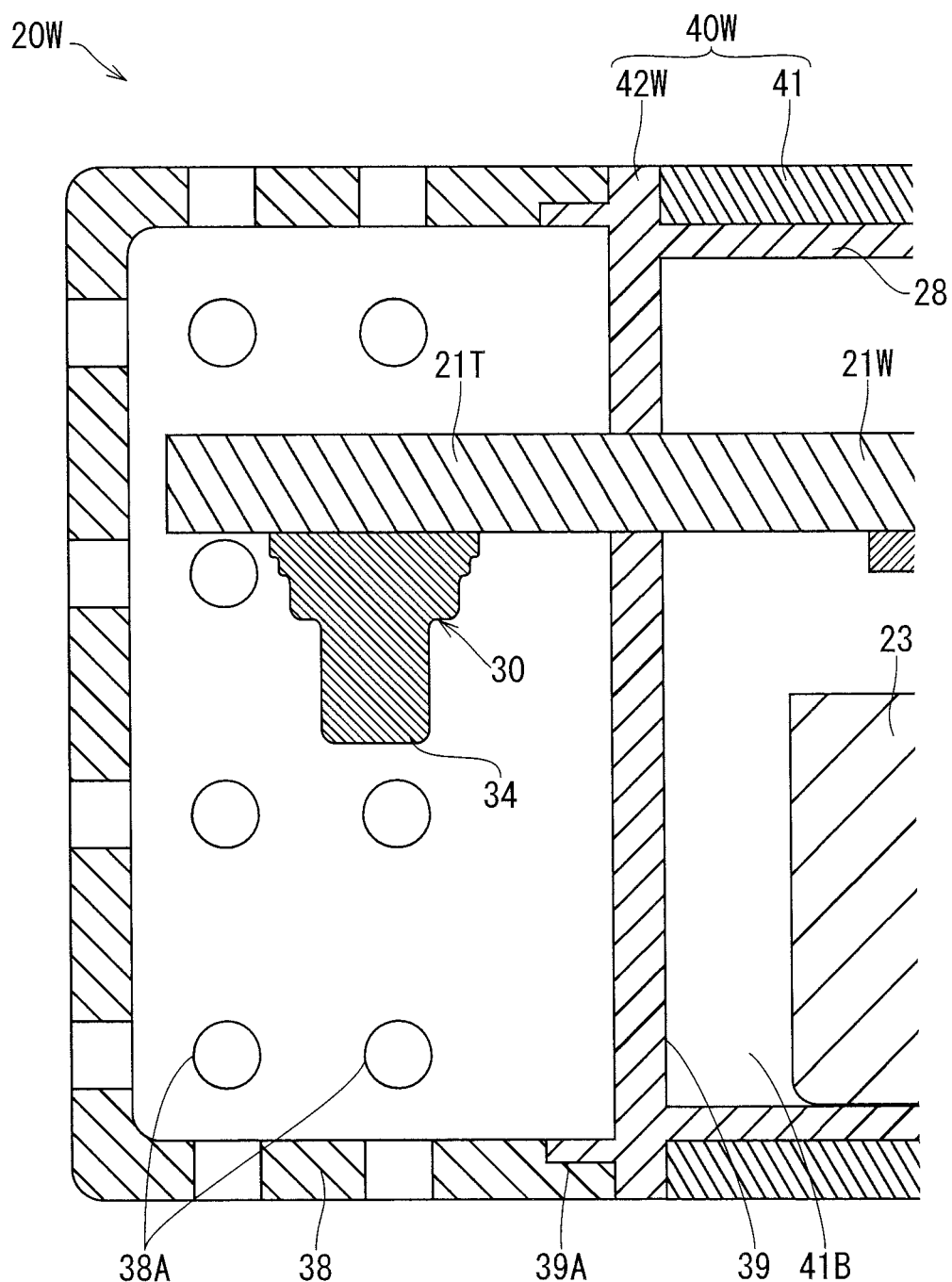
FIG. 7 is a cross-sectional side view of a front end part of the wireless terminal according to a fourth embodiment.

This embodiment is illustrated in FIG. 7 and different from the first embodiment only in the structure of a front end part of a wireless terminal 20W. Namely, a lid member 42W of the wireless terminal 20W of this embodiment is integrally formed on a front end part of the support frame 28. The lid member 42W is disc-shaped and has substantially the same outside diameter as that of the case body 41. The lid member 42W is fixed with adhesive or by welding, with the outer edge of the rear face of the lid member overlapped on the front face of the case body 41.

A main circuit board 21W is provided with a sensor-carrying waterproof part 21T that extends through the lid member 42W and protrudes to the front of the lid member 42W in a cantilevered manner. The part of the lid member 42W where the main circuit board 21W extends through is provided with a waterproof seal so that the interior of the case body 41 is a waterproof compartment 41B. All the electrical circuits of the wireless terminal 20W except for the sensor-carrying waterproof part 21T are accommodated inside the waterproof compartment 41B.

The pressure sensor 30 is mounted on one side of the sensor-carrying waterproof part 21T that faces down when the wireless terminal 20W takes the basic posture. The sensor circuit 30C (see FIG. 4) is arranged in a portion of the main circuit board 21W that is located inside the waterproof compartment 41B. Printed circuit lines that connect this sensor circuit 30C and the pressure sensor 30 extend between inside and outside of the lid member 42W. The entire sensor-carrying waterproof part 21T is waterproofed (for example, laminated with a waterproof film) except for the pressure-receiving measurement surface 34 at a distal end of the pressure sensor 30 (in this embodiment, a lower end of the pressure sensor 30).

A sensor protection case 38 accommodating the sensor-carrying waterproof part 21T is fixed to a front face of the case 40W. The sensor protection case 38 is cylindrical with a bottom at one end and an opening at the other end, and has the same outside diameter as that of the case body 41. The sensor protection case is fitted over an annular rib 39A protruding from a front face of the lid member 42W near the outer edge and fixed thereto with adhesive or the like. A plurality of through holes 38A is formed in the sensor protection case 38.

The wireless terminal 20W of this embodiment provides similar advantageous effects as those of the wireless terminals 20 and 20V of the first and second embodiments. The wireless terminal 20W is maintained in substantially the same basic posture in the liquid. The surface on which the pressure sensor 30 is mounted in the sensor-carrying waterproof part 21T faces downward, and the pressure-receiving measurement surface 34 of the pressure sensor 30 faces downward, too. Thus, contact between roughages and the pressure-receiving measurement surface 34 is reliably prevented.

In this embodiment, the case 40W made up of the case body 41 and the lid member 42W corresponds to a "waterproof case", and the main circuit board 21W corresponds to a "sensor-carrying circuit board" in the claims.

OTHER EMBODIMENTS

The present invention is not limited to the embodiments described above. For example, other embodiments as will be described below are also included in the technical scope of the present invention. Also, various other changes can be made in carrying out the invention without departing from the scope of the invention.

(1) The respective wireless terminals 20, 20V, and 20W of the embodiments described above may include a magnet fixed thereto so as to allow easy removal of the wireless terminal 20, 20V, or 20W from the stomach 10S of a cow 10. Specifically, a magnet may be fixed to a rear end portion of the case body 41. A wire with a magnet fixed to the tip may be inserted into the cow's stomach as with endoscopy so that the magnets stick together and the wireless terminal 20, 20V, or 20W can be pulled out.

(2) While the measurement hole 46 in the embodiments described above has a structure bent in T shape, the shape of the measurement hole 46 is not limited to this. The hole may be bent in other shapes than the T shape, or may be linear, or curved.

(3) A temperature sensor or acceleration sensor may be mounted to the main circuit board 21.

(4) The data analysis unit 52 may use artificial intelligence to determine abnormalities. For example, a machine learning model that has learned beforehand about the pressures inside the stomachs 10S of healthy cows 10 and cows 10 with bloat may be given a pressure output from the wireless terminal 20 in a target stomach to determine if there is bloat or not. The artificial intelligence may be trained to learn not only the pressure inside the stomach 10S but also any corresponding relationship between pressure and physical data such as body weight and size, or other data inside the stomach 10S such as temperature and acceleration, and this physical data or temperature/acceleration data of the cow 10 may be given together with the pressure inside the stomach 10S of the target cow 10 when making determination.

(5) The wireless terminal 20 may be left in the stomachs 10S of other livestock animals instead of the stomachs 10S of cows 10 as in the embodiments described above.

(6) The support frame 28 may be integrally formed with the case body 41 instead of being a separate component from the case body 41 as in the embodiments described above.

(7) The battery 22 may be connected to the main circuit board 21 with a cable instead of the pair of bus bars 28B as in the embodiments described above.

(8) The antenna 12 of the wireless circuit 11 may be provided in the form of an antenna pattern on the sub circuit board 31 instead of on the main circuit board 21 as in the embodiments described above.

(9) In the above embodiments, the pressure sensor 30 and the sensor circuit 30C are mounted on the sub circuit board 31, and measurement results of the pressure sensor 30 are output to the signal processing circuit 13 via the sensor circuit 30C. Alternatively, the measurement results of the pressure sensor 30 may be output via a serial bus such as I2C.

(10) In the above embodiments, the O-ring 48 is compressed between the inner circumferential surface of the O-ring receiving part 44A and the outer circumferential surface of the head part 33 of the pressure sensor 30. In an alternative configuration, the O-ring may be compressed between the stepped surface 44D of the O-ring receiving part 44A and the stepped surface 30D of the pressure sensor 30.

(11) The main circuit board 21W in the fourth embodiment may be embedded in insulating resin by potting instead of being accommodated inside the waterproof compartment 41B.

DESCRIPTION OF THE REFERENCE NUMERAL

10 Cow (livestock animal)
10S Stomach
11 Wireless circuit
12 Antenna
18 Waterproof sheet (pressure-receiving pressure measurement part)
19 Sealed space
20, 20V, 20W Wireless terminal
21T Sensor-carrying waterproof part
21W Main circuit board (sensor-carrying circuit board)
30 Pressure sensor
34 Pressure-receiving measurement surface (pressure-receiving pressure measurement part)
38 Sensor protection case 38A Through hole
40, 40V, 40W Case
41 Case body
41B Waterproof compartment
42, 42V, 42W Lid member
42H Lid body (protection wall part)
44 First linear part
45 Second linear part
46 Measurement hole
50 Cloud server
52 Data analysis unit
60 Portable terminal
100 Livestock monitoring system

The invention claimed is:

1. A wireless terminal comprising a pressure sensor, a wireless circuit, and a case that accommodates the pressure sensor and the wireless circuit in a waterproof manner, the wireless terminal being left inside a stomach of a livestock animal to measure pressure inside the stomach and wirelessly transmit acquired pressure data, wherein:
the case includes a cylindrical case body with a bottom at one end and an opening at another end, and a lid member closing the opening of the case body;
the lid member has a measurement hole extending between inside and outside of the lid member and a protection wall part located outside of the case body, the measurement hole having a pressure-receiving pressure measurement part at a distal end for measurement of the pressure, and the pressure sensor fits into the measurement hole so that the pressure-receiving pressure measurement part closes the measurement hole by fitting the lid member to the case body;
the measurement hole includes a first linear part extending linearly from an inner face of the lid member to an internal portion of the protection wall part, and a second linear part extending through the protection wall part in a direction perpendicular to an axial direction of the case body, intersecting in T shape with the first linear part, and having distal ends open to an outer face of the protection wall part.

2. The wireless terminal according to claim 1, wherein the pressure-receiving pressure measurement part is a waterproof sheet stretched in a midway position of the measurement hole and elastically deforms in response to the pressure, and the pressure sensor is fitted in the measurement hole in an airtight manner and forms a sealed space between the pressure sensor and the waterproof sheet, and the pressure sensor measures internal pressure of the sealed space as pressure inside the stomach.

3. The wireless terminal according to claim 1, wherein the wireless terminal has a center of gravity located at a lower point of the wireless terminal in a basic posture so as to be maintained in substantially the same basic posture in liquid.

4. The wireless terminal according to claim 3, wherein the wireless circuit has an antenna oriented to have a constant direction of transmission when the wireless terminal takes the basic posture.

5. The wireless terminal according to claim 1, wherein the wireless terminal as a whole has a specific gravity of 1.8 g/cm3 or more.

6. A livestock monitoring system comprising:
a plurality of the wireless terminals according to claim 1; and
a monitoring apparatus that acquires the pressure data wirelessly transmitted from the plurality of the wireless terminals and terminal identification data for distinguishing the wireless terminals from one another, and monitors physical conditions of a plurality of livestock animals.

7. The livestock monitoring system according to claim 6, wherein the monitoring apparatus includes a data analysis unit that compares pressure data from the plurality of the wireless terminals and identifies a wireless terminal that has sent abnormal pressure data.

8. The livestock monitoring system according to claim 7, wherein the data analysis unit determines whether or not each of the pressure data is abnormal using artificial intelligence.

9. The livestock monitoring system according claim 7, wherein the data analysis unit determines whether or not each of the livestock animals provided with the wireless terminal has bloat.

10. The livestock monitoring system according to claim 6, wherein the monitoring apparatus includes a data analysis unit that compares pressure data from each of the wireless terminals with preset reference data and identifies a wireless terminal that has sent abnormal pressure data.

11. The livestock monitoring system according to claim 10, wherein the data analysis unit determines whether or not each of the pressure data is abnormal using artificial intelligence.

12. The livestock monitoring system according claim 10, wherein the data analysis unit determines whether or not each of the livestock animals provided with the wireless terminal has bloat.

13. A livestock monitoring method comprising steps of: leaving a plurality of the wireless terminals according to claim 1 in stomachs of a plurality of livestock animals; acquiring the pressure data wirelessly transmitted from the plurality of wireless terminals and terminal identification data for distinguishing the wireless terminals from one another; and monitoring physical conditions of the plurality of livestock animals.

14. A wireless terminal comprising a pressure sensor, a wireless circuit, and a case that accommodates the pressure sensor and the wireless circuit in a waterproof manner, the wireless terminal being left inside a stomach of a livestock animal to measure pressure inside the stomach and wirelessly transmit acquired pressure data, wherein:
the case includes a cylindrical case body with a bottom at one end and an opening at another end, and a lid member fitted to the case body so as to close the opening of the case body and having a measurement hole extending between inside and outside of the lid member;
the pressure sensor is fixed to the case body, protruding toward the lid member, and having a pressure-receiving pressure measurement part at a distal end for measurement of the pressure; and
the pressure sensor fits into the measurement hole so that the pressure-receiving pressure measurement part closes the measurement hole by fitting the lid member to the case body.

15. The wireless terminal according to claim 14, wherein the measurement hole is bent or curved between the pressure-receiving pressure measurement part and an outer face of the case.

16. The wireless terminal according to claim 14, wherein the wireless terminal has a center of gravity located at a lower point of the wireless terminal in a basic posture so as to be maintained in substantially the same basic posture in liquid.

17. The wireless terminal according to claim 16, wherein the wireless circuit has an antenna oriented to have a constant direction of transmission when the wireless terminal takes the basic posture.

18. The wireless terminal according to claim 14, wherein the wireless terminal as a whole has a specific gravity of 1.8 g/cm3 or more.

19. A livestock monitoring method comprising the steps of: leaving a plurality of the wireless terminals according to claim 14 in stomachs of a plurality of livestock animals; acquiring the pressure data wirelessly transmitted from the plurality of wireless terminals and terminal identification data for distinguishing the wireless terminals from one another; and monitoring physical conditions of the plurality of livestock animals.

20. A wireless terminal having a pressure sensor and a wireless circuit, and left inside a stomach of a livestock animal to measure pressure inside the stomach and wirelessly transmit acquired pressure data, the wireless terminal comprising:
- a sensor-carrying circuit board having the pressure sensor mounted thereon and a waterproofed sensor-carrying waterproof part;
- a waterproof case having therein a waterproof compartment that accommodates an electrical circuit disposed in a part other than the sensor-carrying waterproof part of the wireless terminal, and supporting the sensor-carrying circuit board such that the sensor-carrying waterproof part extends out of the waterproof compartment; and
- a sensor protection case integrally formed in or fixed to the waterproof case, accommodating the sensor-carrying waterproof part, and having a plurality of through holes extending between inside and outside of the sensor protection case, wherein the wireless terminal has a center of gravity located at a lower point of the wireless terminal in a basic posture so as to be maintained in substantially the same basic posture in liquid, and
- a surface of the sensor-carrying waterproof part on which the pressure sensor is mounted faces downward and a pressure-receiving pressure measurement part of the pressure sensor faces downward when the wireless terminal takes the basic posture.

* * * * *